(12) United States Patent
Gentile et al.

(10) Patent No.: US 7,711,660 B1
(45) Date of Patent: May 4, 2010

(54) PROCESSING HEALTH INSURANCE DATA UTILIZING DATA QUALITY RULES

(75) Inventors: David Gentile, Wolcott, CT (US); John Michael Brillante, Wallingford, CT (US); Jennifer Ann Wipprecht, Marlborough, CT (US); Paul Michael Lisella, Wethersfield, CT (US)

(73) Assignee: Ingenix, Inc., Eden Prairie, MN (US)

( * ) Notice: Subject to any disclaimer, the term of this patent is extended or adjusted under 35 U.S.C. 154(b) by 746 days.

(21) Appl. No.: 11/675,347

(22) Filed: Feb. 15, 2007

Related U.S. Application Data

(60) Provisional application No. 60/773,855, filed on Feb. 16, 2006.

(51) Int. Cl.
*G06F 15/18* (2006.01)
*G06Q 10/00* (2006.01)
*G06Q 50/00* (2006.01)

(52) U.S. Cl. .................. 706/8; 705/2; 705/4; 706/47
(58) Field of Classification Search ............ 705/2; 707/104.1, 100; 364/413.01; 706/8, 47
See application file for complete search history.

(56) References Cited

U.S. PATENT DOCUMENTS

| | | | | |
|---|---|---|---|---|
| 5,307,262 A | * | 4/1994 | Ertel | 705/2 |
| 2006/0247947 A1 | * | 11/2006 | Suringa | 705/2 |
| 2007/0016596 A1 | * | 1/2007 | Fabret et al. | 707/100 |

* cited by examiner

*Primary Examiner*—Donald Sparks
*Assistant Examiner*—Ola Olude Afolabi
(74) *Attorney, Agent, or Firm*—Adriana S. Luedke; Dorsey & Whitney LLP

(57) ABSTRACT

In a system and method for processing data, a user interface enables a user to enter mapping data to enable incoming data to be converted to a common data format. A database stores the mapping data and data quality rules, and a receiver receives data from a data source. The processor applies the data quality rules to the common format data to identify any potential errors in the common format data and notifies the user of any potential errors found in the common format data. The data rules may include data structure rules and/or data trending requirements based upon data trends or norms. The data source may be an employer, insurance company or other entity. The data may include insurance claim data, medical data and/or prescription data and/or eligibility and/or occupational and non-occupational data.

6 Claims, 22 Drawing Sheets

| Logical Name | ICF Variable Name | Source Fields For Transformation | Transformation | Business Logic | User Comments |
|---|---|---|---|---|---|
| PERSON CHANGE DATE | PERS_CHANGE_DT | -Select- | Transform | | |
| PERSON AGE | PERSON_AGE | -Select- | Transform | | |
| DATE OF BIRTH | DOB | -Select- | Transform | if($IPVA_RECORD_TYPE | |
| PERSON SSN | PERSON_SSN | -Select- | Transform | if($IPVA_RECORD_TYPE | |
| PERSON FIRST NAME | PERS_FIRST_NAME | -Select- | Transform | if($IPVA_RECORD_TYPE | |
| PERSON LAST NAME | PERS_LAST_NAME | -Select- | Transform | if($IPVA_RECORD_TYPE | |
| PERSON ADDRESS LINE 1 | PERS_ADDR_1 | -Select- | Transform | if($IPVA_RECORD_TYPE | |
| PERSON ADDRESS LINE 2 | PERS_ADDR_2 | -Select- | Transform | if($IPVA_RECORD_TYPE | |
| PERSON ZIP CODE | PERS_ZIP_CODE | -Select- | Transform | if($IPVA_RECORD_TYPE | |

Modify ICF Transformation for Carrier Code HARR and Format Code WILL

General Comments

Trending Rule Overrides

| | | | | |
|---|---|---|---|---|
| RunId | 360 | Submission Difference = (%Current Submission - %Previous Submission)/ %Previous Submission | | |
| Client | 15 | Passing Range | -15% to +15% | |
| File Name | land_land_land_F20050401_T20050430_Vel25.txt | Change Difference = %Current Submission - %Previous Submission | | |
| Carrier | LAND O LAKES | Record Count | Passing Range | |
| Recieved Date | 2005-10-27 | Less Than 10000 | -5% to +5% | |
| Sub Period | Apr 2005 to Apr 2005 | 10001 -25000 | -3% to +3% | |
| | | Greater Than 25000 | -1% to +1% | |

Rule Level: All
Period: All     [Apply Filter] [Back]

| RuleID | Trend Level | Level Conditions | Previous Submission (%) | Current Submission (%) | Submission Diff | Change Diff | Trending Period | Reason for Override |
|---|---|---|---|---|---|---|---|---|
| 1 | Subscriber | SUBSCRIBER PERSON IDENTIFIER = 504 | 0 | 1.19 | 0 | 100 | MONTHLY | |
| 1 | Subscriber | SUBSCRIBER PERSON IDENTIFIER = 503 | 0 | 1.4 | 0 | 100 | MONTHLY | |
| 1 | Subscriber | SUBSCRIBER PERSON IDENTIFIER = 501 | 0 | 1.13 | 0 | 100 | MONTHLY | |
| 1 | Subscriber | SUBSCRIBER PERSON IDENTIFIER = 484 | 0 | 1.08 | 0 | 100 | MONTHLY | |
| 1 | Subscriber | SUBSCRIBER PERSON IDENTIFIER = 478 | 0 | 1.05 | 0 | 100 | MONTHLY | |
| 1 | Subscriber | SUBSCRIBER PERSON IDENTIFIER = 476 | 0 | 2.06 | 0 | 100 | MONTHLY | |
| 1 | Subscriber | SUBSCRIBER PERSON IDENTIFIER = 474 | 0 | 2.14 | 0 | 100 | MONTHLY | |
| 1 | Subscriber | SUBSCRIBER PERSON IDENTIFIER = 472 | 0 | 1.86 | 0 | 100 | MONTHLY | |
| 1 | Subscriber | SUBSCRIBER PERSON IDENTIFIER = 469 | 0 | 2.28 | 0 | 100 | MONTHLY | |
| 1 | Subscriber | SUBSCRIBER PERSON IDENTIFIER | 16.67 | 0 | 0 | -100 | MONTHLY | |

FIG. 16

PROCESSING HEALTH INSURANCE DATA UTILIZING DATA QUALITY RULES

RELATED APPLICATIONS

This application claims priority to U.S. Provisional Patent Application Ser. No. 60/773,855, filed Feb. 16, 2006, and entitled "System and Method for Automated Processing and Analysis of Health Insurance Claims," which is incorporated by reference herein in its entirety.

BACKGROUND OF THE INVENTION

In the insurance industry, it is desirable for entities such as health plan administrators or carriers that administer benefit-related insurance claims, such as medical claims, dental claims, vision claims, prescription drug claims, occupational and non-occupational claims and enrollment information to periodically evaluate the data that have already been processed and/or paid under each policy to assess the cost and utilization associated with the policy and/or for a variety of other reasons. However, data collection and processing prior to substantive analysis of the data may be a time consuming and expensive process. First, the data from each data source is submitted in one or more non-standardized data formats, requiring reformatting of the data prior to data analysis. Thus, the individuals working with the data from multiple sources must have computer programming skills in addition to business analysis skills. Then, once the data have been formatted, it must be quality checked for formatting and data accuracy as well as for compliance with industry or carrier norms or trends. These quality checking processes may be time-consuming, tedious and labor-intensive processes that require individuals to manually review thousands of data items. As a result, human error in the quality checking processes is not uncommon. Thus, there is a need for a system that addresses the drawbacks of the existing approach to formatting and quality checking of data to prepare the data for analysis, for example, by employers, health plan administrators or other entities.

SUMMARY OF THE INVENTION

In view of the drawbacks of existing processes for data compilation and formatting as described above, the present invention provides a system and method for automating the data collection, reformatting and quality checking processes described above. First, the system and method provide for formatting of medical, prescription drug, eligibility and other types of data from each data supplier in the supplier's own format into a common data format using a web-based data formatting software application. Second, the system and method provide for automated quality checking of the structure and/or completeness (e.g., presence of data in defined fields, number of records or length of records) of the received data. Third, the system and method provide for automated quality processing of the data to verify compliance of the data compared to industry trends or norms for claims filed under each policy. Data that are not complete, has structural variations or does not comply with one or more of the trends or norms is flagged for review, for example, using a manual review process to resolve the non-compliance issue. Once data is approved, either automatically or upon completion of the review process, the approved data may be made available for download for subsequent use in data analysis concerning many aspects of health care operations, including the cost of payments under each policy as well as analysis of the claims submitted and paid under the policy.

This system and method may also be applied to format and quality process other types of data in addition to health insurance data, such as life insurance data, property insurance data, and/or automobile insurance data.

A system for processing insurance data includes a user interface for enabling a user to enter mapping data to enable incoming insurance data to be converted to a common data format; a database for storing the mapping data and data quality rules; a receiver for receiving insurance data from a data source; and a processor for automatically formatting the received data into the common data format using the mapping data input by the user to create common format data. The processor applies the data quality rules to the common format data to identify potential errors in the common format data and notifies the user of any common format data containing one or more potential errors. The user is able to resolve the one or more potential errors in the common format data to complete quality checking of the common format data. The data quality rules may include data quality structure rules and data trending requirements. The user may accept or reject the common format data containing potential errors, such that rejected common format data is removed from the common format data. Alternatively or additionally, the user redefines the mapping data or data quality rules to enable acceptance of values in the common format data identified as containing one or more potential errors.

A method for processing insurance data includes receiving mapping data entered by a user via a user interface to enable incoming insurance data to be converted to a common data format; storing the mapping data and data quality rules; receiving insurance data from a data source; formatting the received data into the common data format using the mapping data input by the user to create common format data; applying the data quality rules to the common format data to identify potential errors in the common format data; notifying the user of any common format data containing one or more potential errors; and receiving instructions input by the user to resolve the one or more potential errors in the common format data to complete quality checking of the common format data.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

Figure 5:
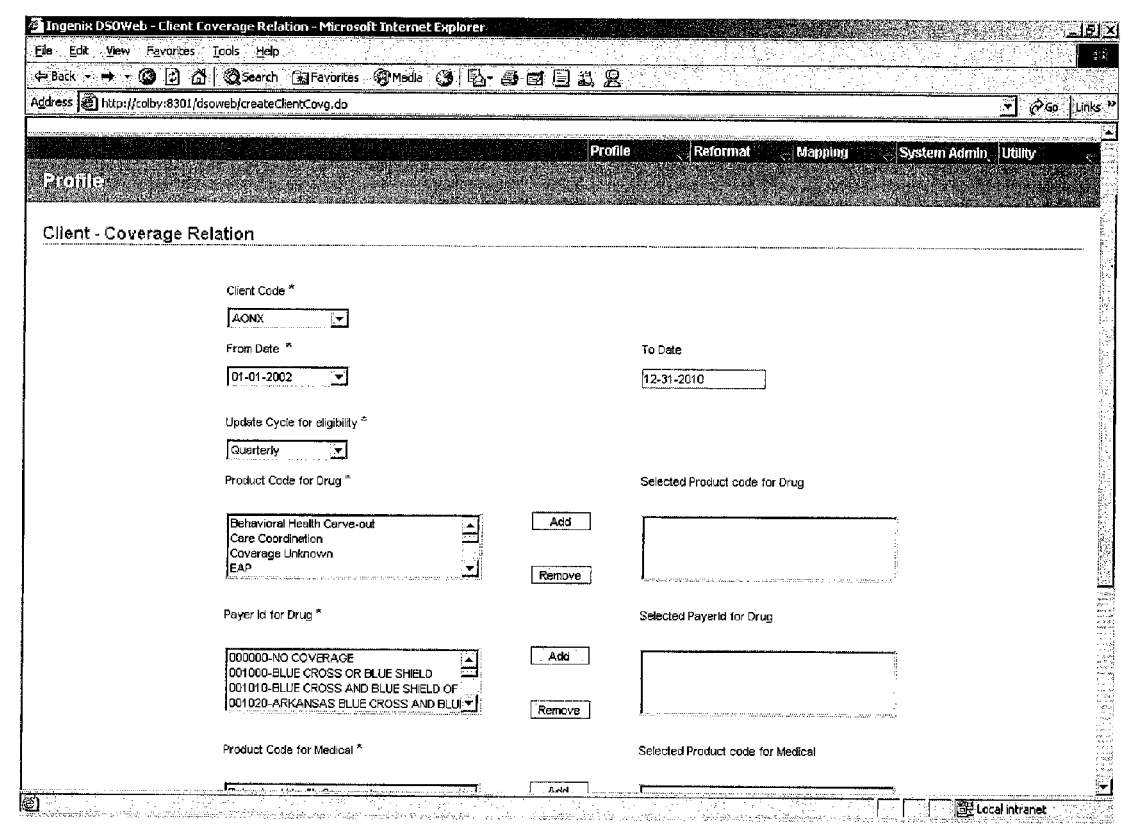

FIGS. 3-11B provide illustrative examples of graphic user interfaces that may be generated by the system of FIG. 1 to enable a user to configure the system prior to processing raw data files.

Figure 16:
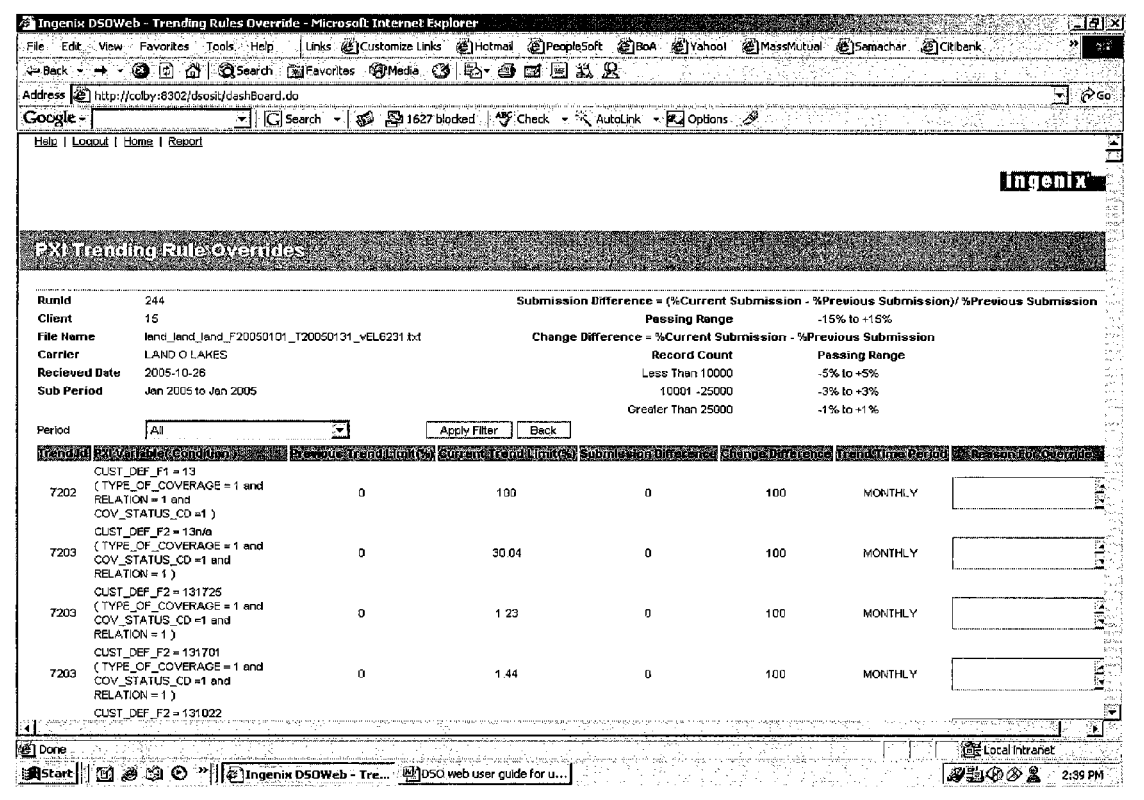

FIGS. 12-16 provide illustrative examples of graphic user interfaces that may be generated by the system of FIG. 1 to enable a user to monitor data processing and quality checking by the system and to resolve potential data errors identified by the system.

DETAILED DESCRIPTION

Figure 1:
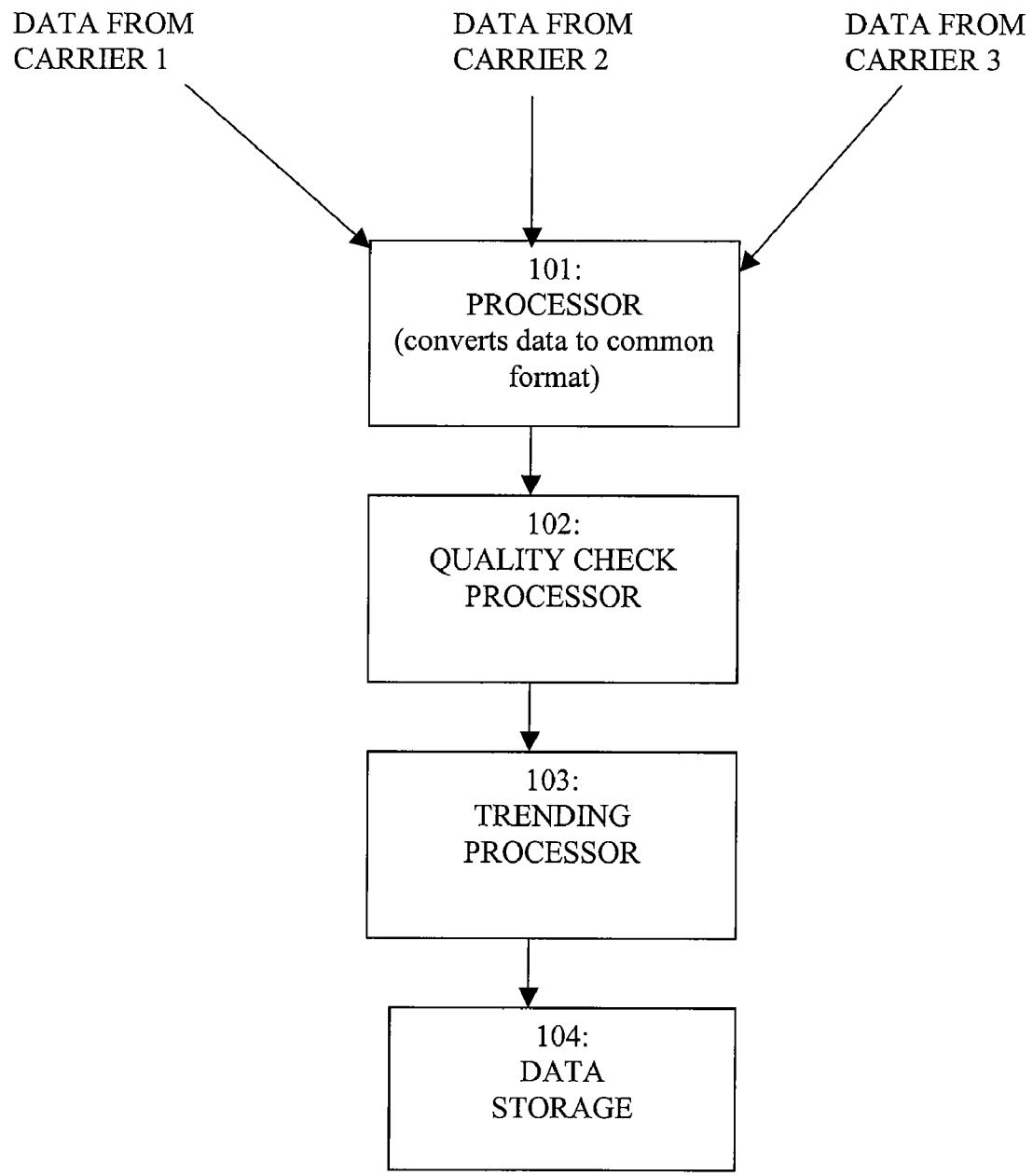
FIG. 1 provides a diagram of a system for processing insurance data in accordance with the present invention.

With reference to FIG. 1, a system 100 in accordance with the present invention includes a processor 101 that receives medical data from a health insurance carrier that represents claims filed, processed and paid under a specific policy ("data"). The system receives set-up information from a user, for example, via an interactive browser-based series of graphic user interfaces. For example, using a point-and-click web-based data formatting application, the user maps the received data into a common format, for example, by indicating which field of the received data corresponds with each field in the common data format. Using the mapping created by the user, the processor automatically formats and stores the received data in the common format. Security may be applied to limit access to the data, for example, providing authorized users with user IDs and passwords.

Once formatted into the common format, the data is then subjected to a quality testing process by quality check processor 102 in which various attributes of the data are verified. For example, attributes to be verified may include completeness of the data set, whether all data fields for the claims have been completed, whether the data includes invalid dates, invalid diagnostic or treatment codes, and/or whether the data within the claims meets defined standards. Such standards may include insuring that the date of payment of the service is later than the date of the service itself, that the hospital admission date is earlier than the discharge date, and/or that procedures relating only to male or female patients are not performed on patients of the opposite sex.

Data that does not pass the quality testing may be flagged for the user to enable correction of the quality problems and may also be separated from the other data prior to further processing and analysis of the data.

Data that passes the quality testing is provided to a processor 103 for analyzing the data by automatically applying to the data a set of rules that are based upon industry trends or norms, for example, national industry trends or norms or trends applicable to the particular type of data. This process is also referred to as compliance checking of the data. For data that satisfies the rules, no manual checking of the data are required, and the data are passed on to data storage 104 for use in generating reports to the carrier concerning the costs and compliance of the data as desired by the carrier. In this way, manual review is limited to review of data for which a deviation or discrepancy from the industry norms rules exists, thus substantially reducing the time and effort needed to manually review the data.

When the data does not meet one or more of the rules, the data and the rule not satisfied are flagged for manual review. Upon reviewing the data, the user may determine that the rule is not applicable to the individual claim or to all claims submitted under a certain policy or by a certain carrier. In such cases, the user may manually override the rule for the present data or for all data received from a certain carrier and/or under a certain policy. Data for which the failed rules are overridden by the user are also provided to data storage 104 for use in generating reports. When rule failures cannot be overridden, the user may reformat the mapping for the analysis process and re-run the data using the revised process. If the data error results from a problem with the raw data, the user may ask the data provider to investigate, correct and resubmit the raw data.

In order to format, quality-check and compliance-check data from each carrier, carrier profiles may be created for each carrier, insured entity or other client and stored in the system. These client profiles may be defined using a browser that enables access to a generic account profile structure and allows for customizing of the generic account profile in accordance with the requirements of the client. The profile for each client is stored and used to automatically format, quality-check and compliance-check the data corresponding to the client's policy in accordance with the definitions provided in the profile.

Figure 1A:
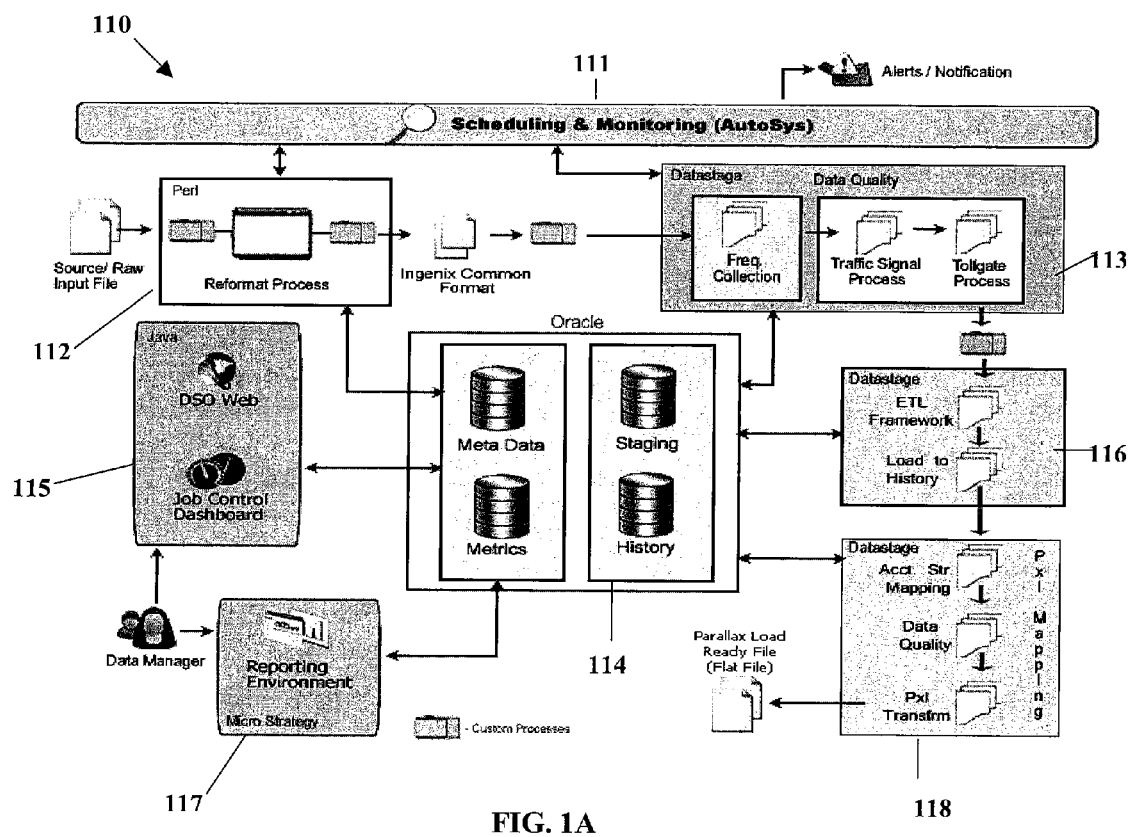
FIG. 1A provides a diagram of one implementation of the system of FIG. 1.

An exemplary detailed implementation of the system 100 of FIG. 1 is provided in FIG. 1A. The system 110 in FIG. 1A includes a scheduling and monitoring component 111 for monitoring the operation of the system 110 and for scheduling the various jobs to be performed by the system 110. A processor 112 receives raw input files containing, for example, previously processed medical, prescription, and/or eligibility data from an employer, health insurance entity or other source and, using client profile, carrier, and account structure information provided by the user (see discussion of FIGS. 3-11B below) and stored in meta data storage component 114, the processor 112 reformats the raw data files into Ingenix Common Format (ICF) or Ingenix Eligibility Common Format (IECF) data files. The common format data files are then provided to processor 113 for data quality processing (described below with reference to FIGS. 12-16) using data stored in database 114. The common format quality-checked data are then subjected to an ETL process by processor 116, transformed into a format for the specific application by processor 118, and loaded into the application. This process is monitored by the user using the DSOWeb (name given to current instance of the invention) module 115, which enables the user to input meta data and other information as well as monitor and implement quality checking procedures as described below with reference to FIGS. 3-16. A reporting environment module 117 may also be provided to generate reports, for example, concerning DSOWeb processing status and history.

Figure 2:
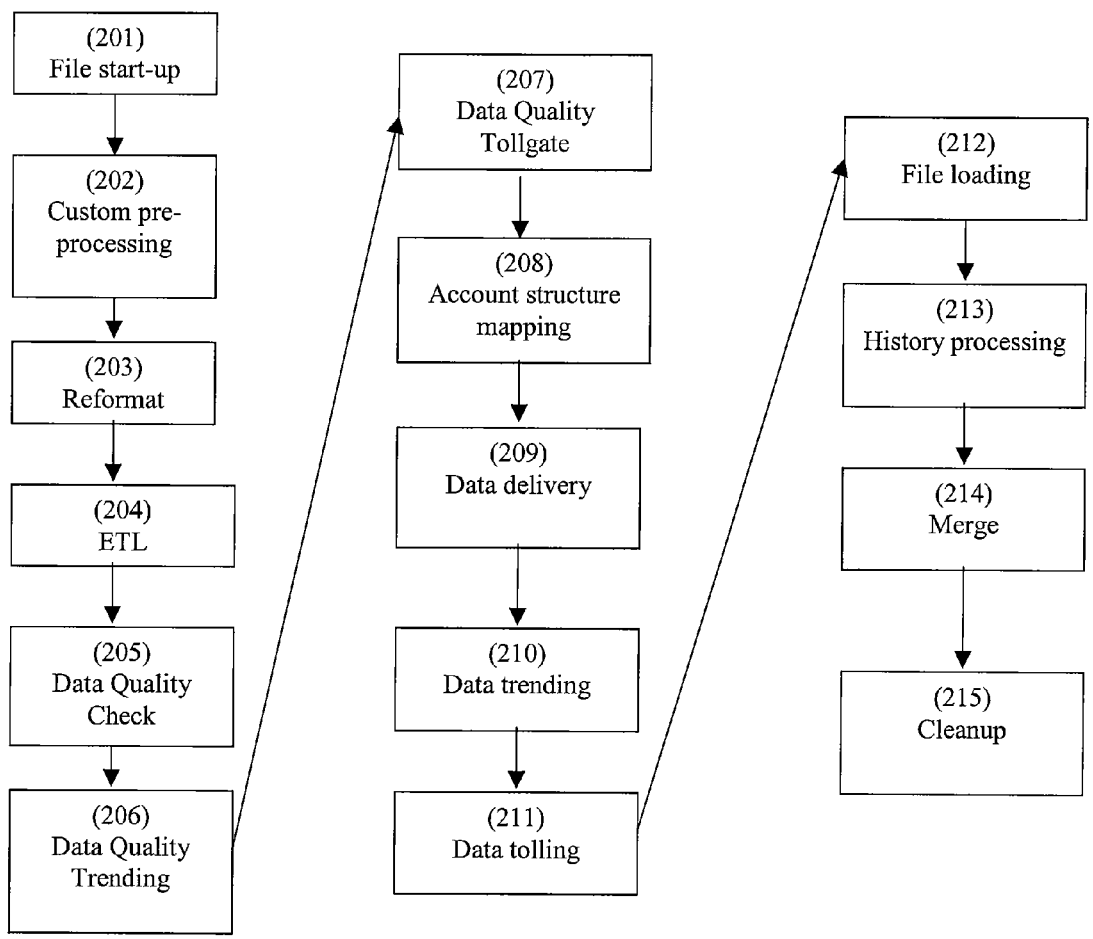
FIG. 2. provides a functional block diagram of a method for processing data in accordance with the present invention.

With reference to FIG. 2, a method for processing insurance data are as follows. This method describes an exemplary series of steps by which raw data received from a data source, such as an insurance claim administrator or other insurance data source, is processed and stored in a uniform, quality-checked format for subsequent data analysis.

(201) File start-up: a data file is identified by confirming that the file name follows a standard format, a RunID is assigned and appended to the file name, and processing of the "job" is initiated.

(202) Custom pre-processing: Source specific input files are converted into a defined file format, such as Web record layout files.

(203) Reformat: In this step, the raw file is converted into a common format. In this example, the common format is called Ingenix® Common Format (ICF). The Ingenix Common Format for eligibility is referred to as IECF (Ingenix Eligibility Common Format).

(204) Extract-Transform-Load (ETL): a data transformation, for example, including an age calculation is performed, and one or more types of data files are created. For example, this step may result in creation of four data files: subscriber, person, coverage, and eligibility feeds.

(205) Data Quality Check: Data quality checking is performed by monitoring whether the values in various fields conform with pre-defined rules.

(206) Data Quality Trending: Data are compared with previous data to identify fluctuations outside of defined value ranges.

(207) Data Quality Tollgate: Data quality errors identified during the data quality check (205) and data quality trending (206) are flagged and displayed to the user on a user interface, such as that illustrated in FIGS. 12-16, which are described in detail below. The user reviews the flagged data to resolve the issues identified during the data quality checking and trending processes.

(208) Account structure mapping: Account structure mappings, for example, as defined by the user, are applied to the ICF tables.

(209) Data delivery: Application specific transformations are applied by combining loaded account structure data, for example, defined by the user, associated with the specific data source ("client") and the client IECF data. Social security number scrambling and other security and data scrubbing processes may also be implemented as desired by the user, required by law, etc. An example of an application specific tool may be a tool that enables users, such as employers, insurance companies or other entities, to run analytic reports on their healthcare costs and utilization for the various program areas using data provided by the process described in FIG. 2.

(210) Data trending: Client data is compared with data from one or more previous time periods to identify any fluctuations in data valued beyond defined ranges.

(211) Data tolling: Errors identified in step 210 are resolved by the user, for example, using forms similar to those used in step 207 above. Additional data checking, such as referential integrity checking to avoid mismatches between the account structure data (e.g., see FIGS. 11A-B) and the submitted data and profile checking (e.g., see FIG. 14) may also be performed on account structure variables.

(212) File loading: An application specific load file is created. This file contains data in the common format that has passed the quality checking processes (including checking and trending) and has been scrubbed to remove Social Security Number information and other sensitive data. These data may now be used by the application specific users such as employers, insurance companies or other entities to run analytic reports on their healthcare costs and utilization for the various program areas.

(213) History processing: Data are saved in a designated data storage facility.

(214) Merge: All quarterly eligibility feeds for a client are merged.

(215) Cleanup: Logs and intermediate files created for the job run that are of no further use are deleted.

Following the completion of the method described in steps 201-215 above, the user may obtain status information, for example, using the user interface, to determine whether the job has run successfully. In this manner, any errors in the job run may be identified and resolved by the user.

Set-Up

To implement the data reformatting and quality checking processes described above with reference to FIG. 2, a user interface is provided, for example, using a Web browser and a series of screen displays that enable a user to enter information associated with each specific data source or client, configure data mapping, and review the data flagged in the data checking and trending processes to resolve identified errors or fluctuations.

An exemplary series of user interface screens generated by a Web-based browser and entitled DSOWeb™ is provided in FIGS. 3-11B.

Figure 3:
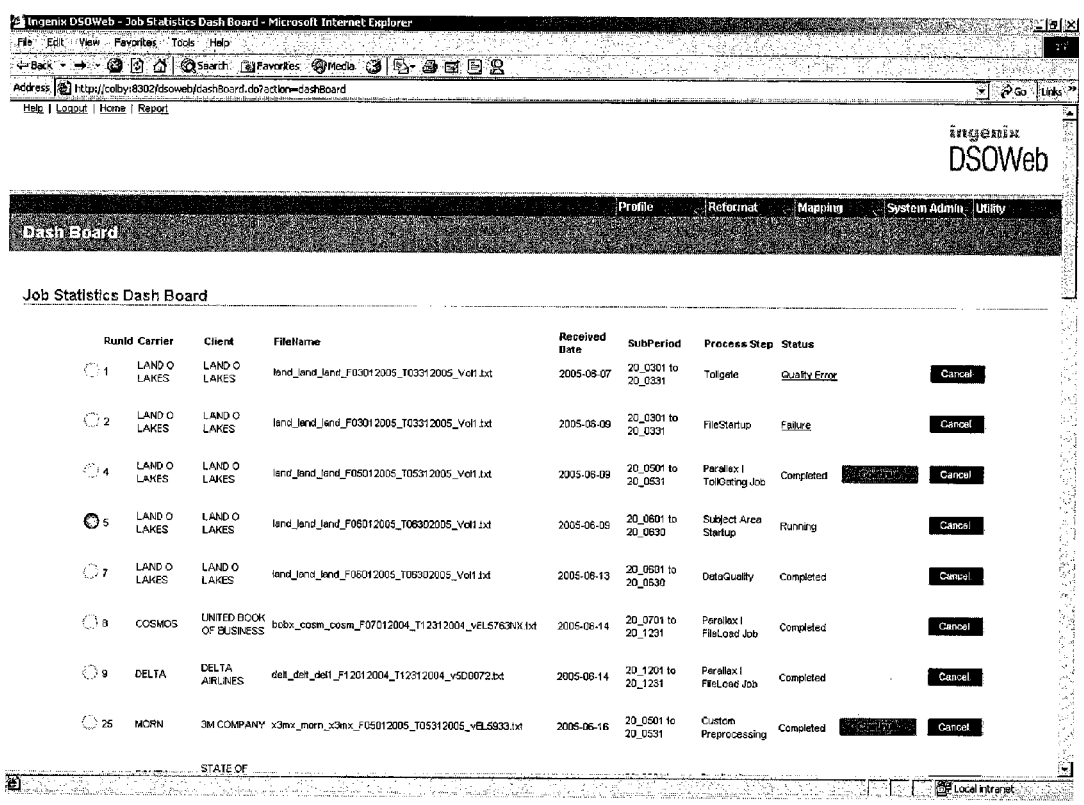

After entering a secure login ID and password, a Job Statistics Dashboard is displayed to the user as illustrated in FIG. 3. The Dashboard screen displays the list of data feeds that have been run by DSOWeb, including the status of data runs pertaining to previously added clients. The user may also optionally receive email reminders concerning the status of data runs for the user's previously entered clients.

The Dashboard of FIG. 3 displays each job's RunID, which is a unique identifier assigned to each job; the carrier; the client; the file name; the received date; the sub-period (the time period for which there is data in the file); the processing step; and the job status.

The processing steps that may be displayed by the Dashboard to describe the status of a particular job are as follows:

| Process Step | Description |
| --- | --- |
| File startup | Data file is identified by confirming that the file name follows the standard file naming format. RunID is appended to the file name and the job is started. |
| Custom pre-processing | Client specific input files are converted into DSOWeb record layout files. |
| Reformat | Converts raw file into Ingenix Common Format (ICF) files. Ingenix Common Format for Eligibility is known as IECF (Ingenix Eligibility Common Format). |
| Standard ETL | Standard transformations such as age calculation are done and a number of data files may be created such as subscriber, person, coverage and eligibility fields |
| Data quality check | Data quality checks are done by monitoring whether the values in various fields conform with pre-defined rules. |
| Data quality trending | Data are compared with previous data to identify fluctuations. |
| Data quality tollgate | Data quality errors identified during the data quality check and data quality trending are displayed through various forms. Data Management Staff then has to resolve these issues. |
| Account structure mapping | Account structure mappings are applied to the ICF tables. |
| Data delivery | Transformations are applied by combining the loaded client account structure data and client common format data. SSN scrambling, key generation etc are also done here. |
| Trending | Client data are compared with previous time period data to identify fluctuations. |
| Tollgate | Errors identified in trending are resolved here by the Data Management Staff through forms similar to those in data quality tollgate step. Referential integrity (RI) checks and Profile checks are also done on account structure variables. |
| Fle load | Load files are created. |
| History processing | Data are saved in the Ingenix data store. |
| Merge | All the monthly or quarterly feeds for a client are merged. |
| Cleanup | Logs and intermediate files created for the job run that are of no use any more are deleted. |

The status displayed by the Dashboard of FIG. 3 indicates to the user whether each job has run successfully as well as identifying quality errors that require attention of the user to resolve, as will be described in further detail below with reference to FIGS. 12-16.

Figure 4:
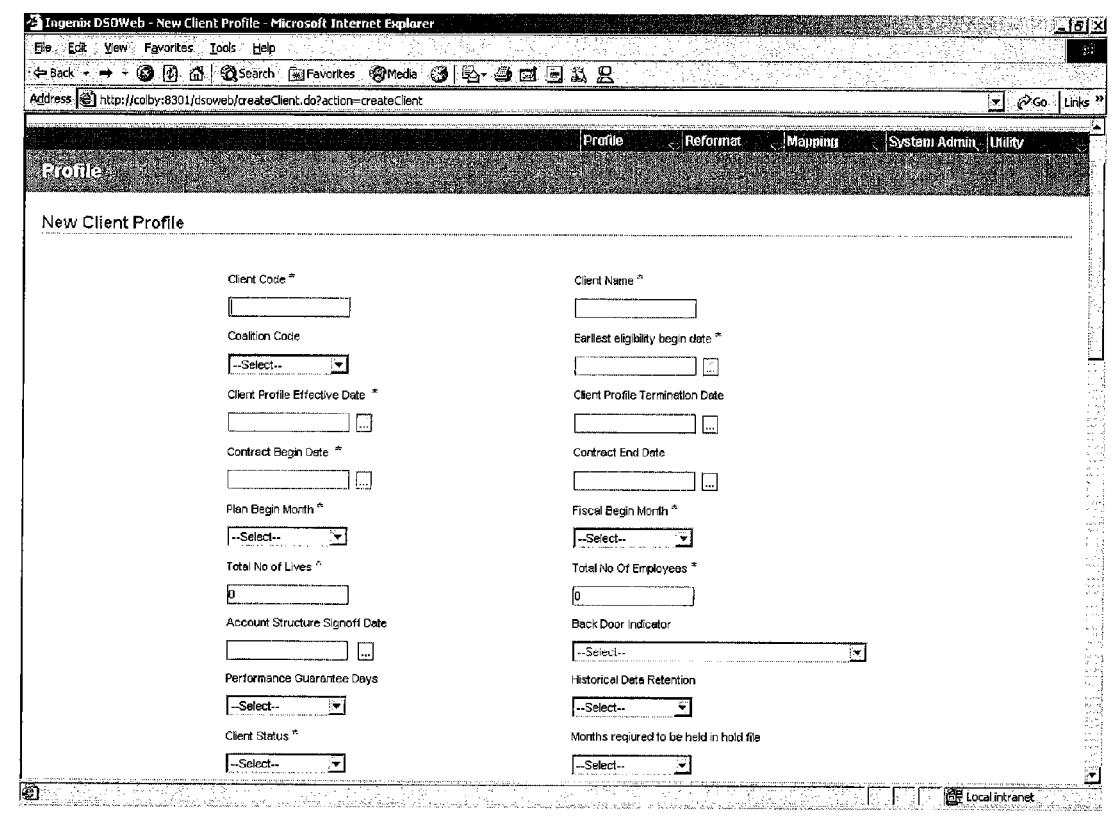

To set up a new client profile (representing a source of raw data in the client's own format), the first step is to add a client profile using a display screen illustrated in FIG. 4. The interface in FIG. 4 is accessed, for example, by selecting Profile>Client>Add New Client from the menu options provided in the display on FIG. 3.

Using the interface shown in FIG. 4, the user enters the client code, client name, client profile effective date, client profile termination date (if any), contract begin date, contract end date (if any), plan begin month, fiscal begin month, estimated employees lives count, estimated lives counts, update cycle, client status, account structure signoff date, back door indicator, performance guarantee, tools purchased (e.g., select from list of possible tools), selected coverages (e.g., select from list of possible coverages), selected employee status (e.g., select from list of possible employee status options), employee identification (SSN or EEID), and a halt indicator. Only the information in the fields marked with asterisks is mandatory. Once the data have been entered by the user, the user selects "Save" and the new client profile is saved.

Similarly, a user may modify an existing client profile by selecting Profile>Client>Modify from the menu options provided in the display of FIG. 3 and modifying the information stored in one or more fields of the existing client profile.

After adding a new client profile, the user is required to define the coverages that are applicable to the client. For example, the user must define the product code and payer ID for the coverages defined in the client's profile. To define a client coverage relation, the user selects Profile>Client>Client Coverage Relation from the menu options provided in the display of FIG. 3. This accesses the user interface shown in FIG. 5. Using this interface, the user enters the client code, the "from date," the "to date," the update cycle for eligibility, a product code for prescriptions (insurance product for covering prescriptions), a payer ID for prescription claims, a product code for medical (insurance product for covering medical treatments, etc.), and a payer ID for medical claims. Again, only fields marked with asterisks are required, and the user saves the data once all required information has been entered. This completes the process of adding a new client. The Client Coverage Relation can also be modified by the user.

Figure 6:
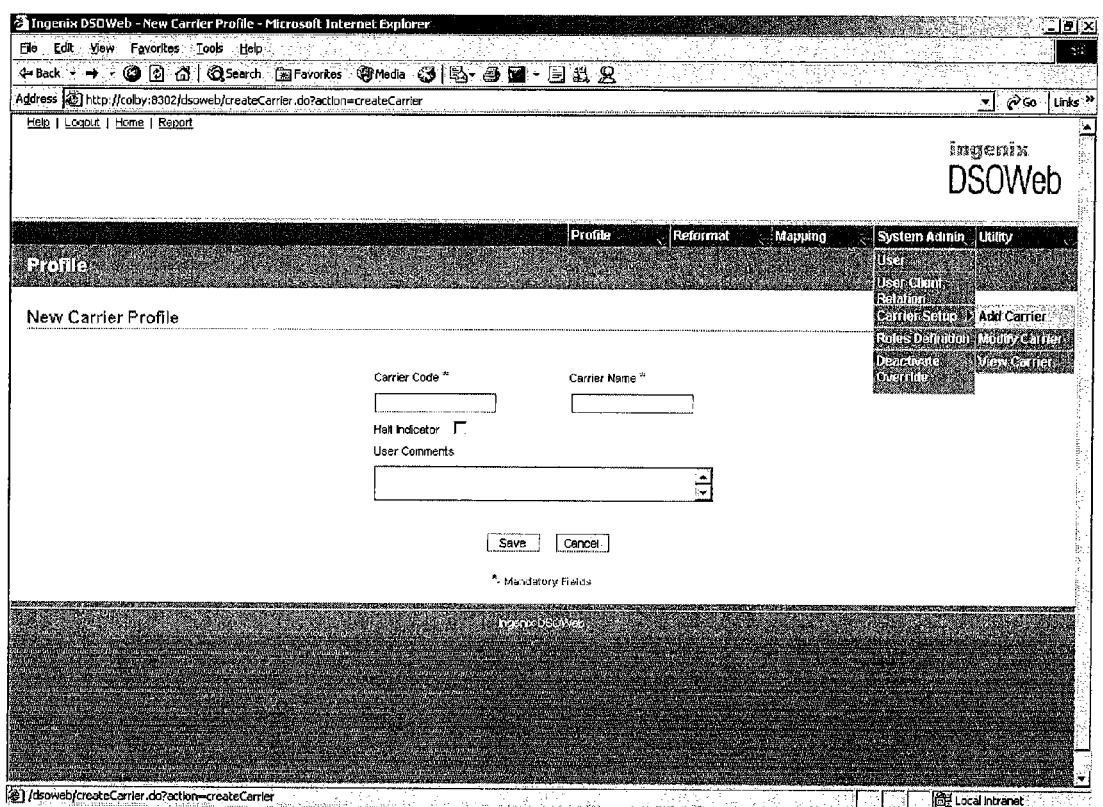

Once a new client has been added, the user must add a carrier by entering carrier profile information using the interface illustrated in FIG. 6, which may be accessible from the Dashboard of FIG. 3 by selecting System Admin>Carrier Setup>Add Carrier menu options.

The interface of FIG. 6 requires the user to enter the carrier code and carrier name as well as an optional halt indicator and optional comments. This information is also saved upon completion and also can be modified by the user.

The next step in the set-up process is entry of reformat information for the job to be run. This information may be entered by the user, for example, using a series of interfaces as depicted in FIGS. 7A-7C.

Figure 7A:
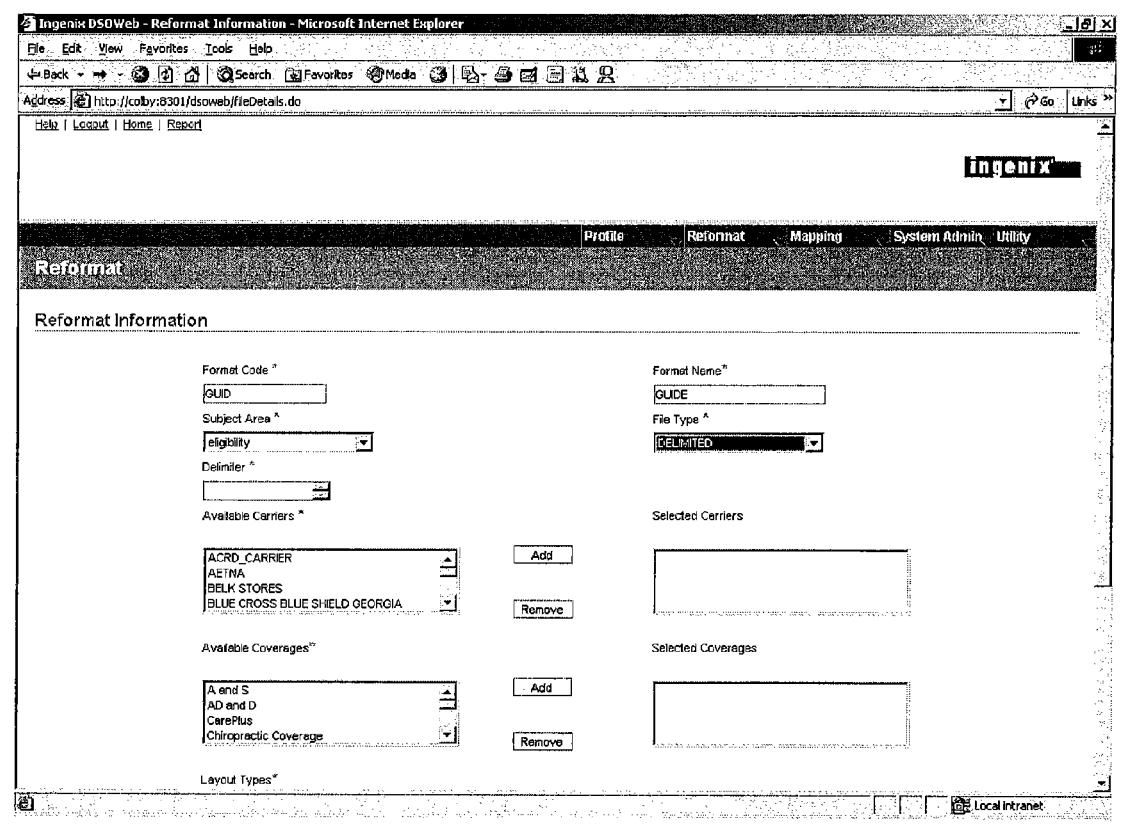

In the interface depicted in FIG. 7A, the user is required to select a unique four-digit format code and a unique reformat program name. The user then enters the applicable subject area (e.g., eligibility, medical, prescription drug) for the implementation, the carrier(s) that are a part of the reformat, the coverages that apply to the reformat, and a layout type definition. This information is saved upon completion by the user.

Figure 7B:
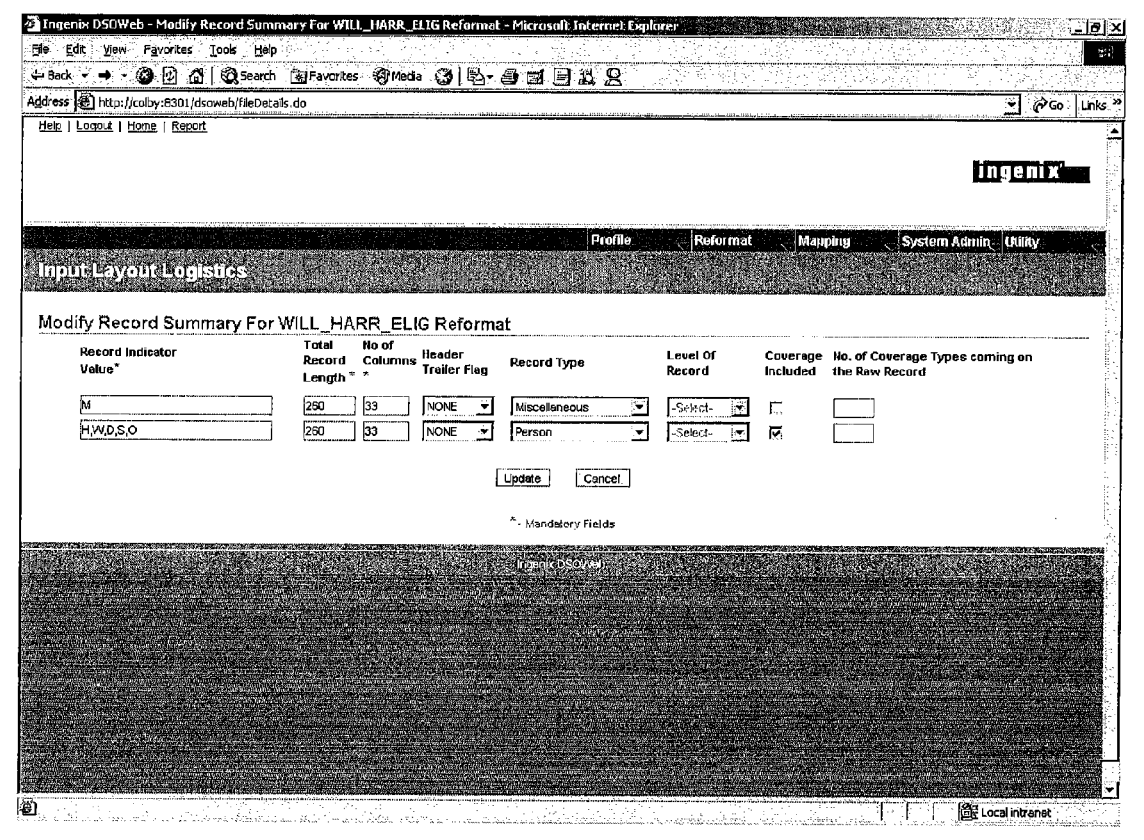

As illustrated by the interface of FIG. 7B, in the next step the user defines the type of records that are expected in the raw data from the client(s) on which the reformat process will be performed. The user enters one or more record indicator values, total record lengths for each record indicator value, the number of columns for each record indicator value, the record type, the level of record, whether coverage is included and the number of coverage types coming on the raw data record. Only the fields marked with asterisks are required, and the information entered by the user is saved upon completion of the screen.

Figure 7C:
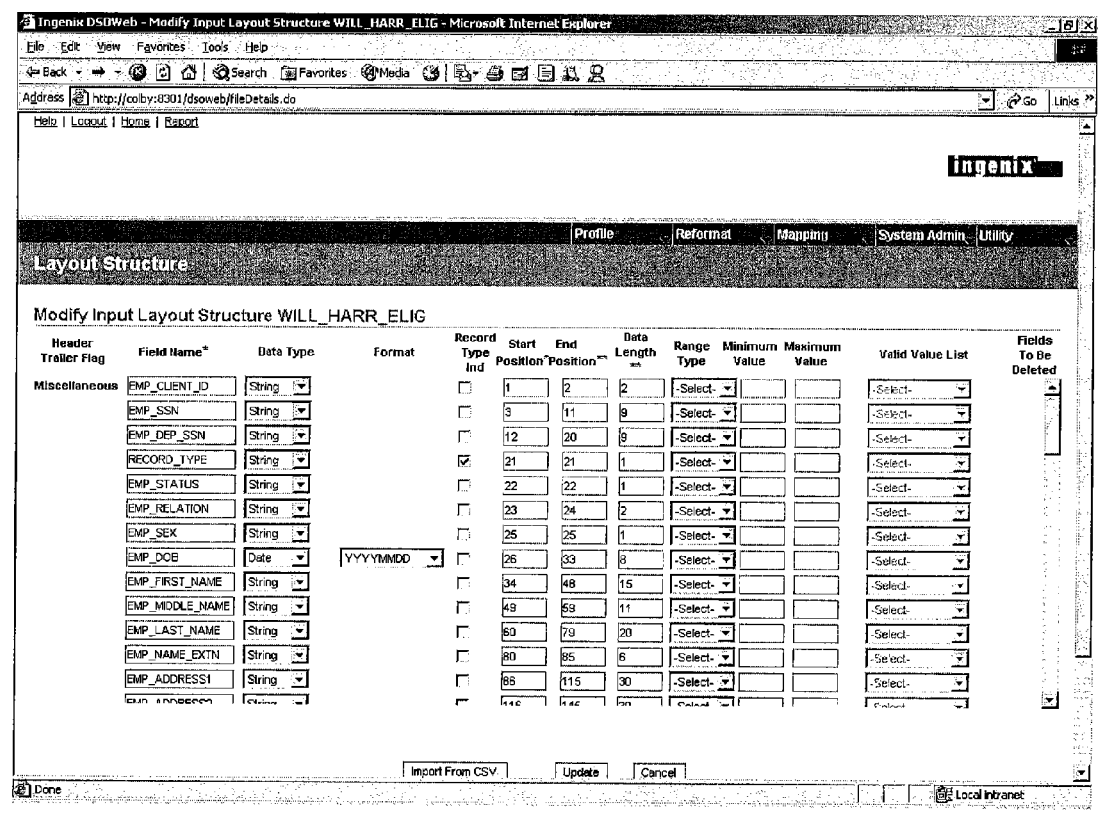

In the final reformatting definition step, the user completes the interface of FIG. 7C, which enables the user to define the layout structure. The system automatically generates a template based upon the layout type entered using the interface in FIG. 7A. As shown in FIG. 7C, the user is required to enter the field name, data type, format, record type indicator, start position, end position, data length, range type, minimum value, maximum value, and valid values list. Only the fields marked with asterisks are required, and the information entered by the user is saved upon completion of the screen. This completes the reformat definition process.

Figure 8:
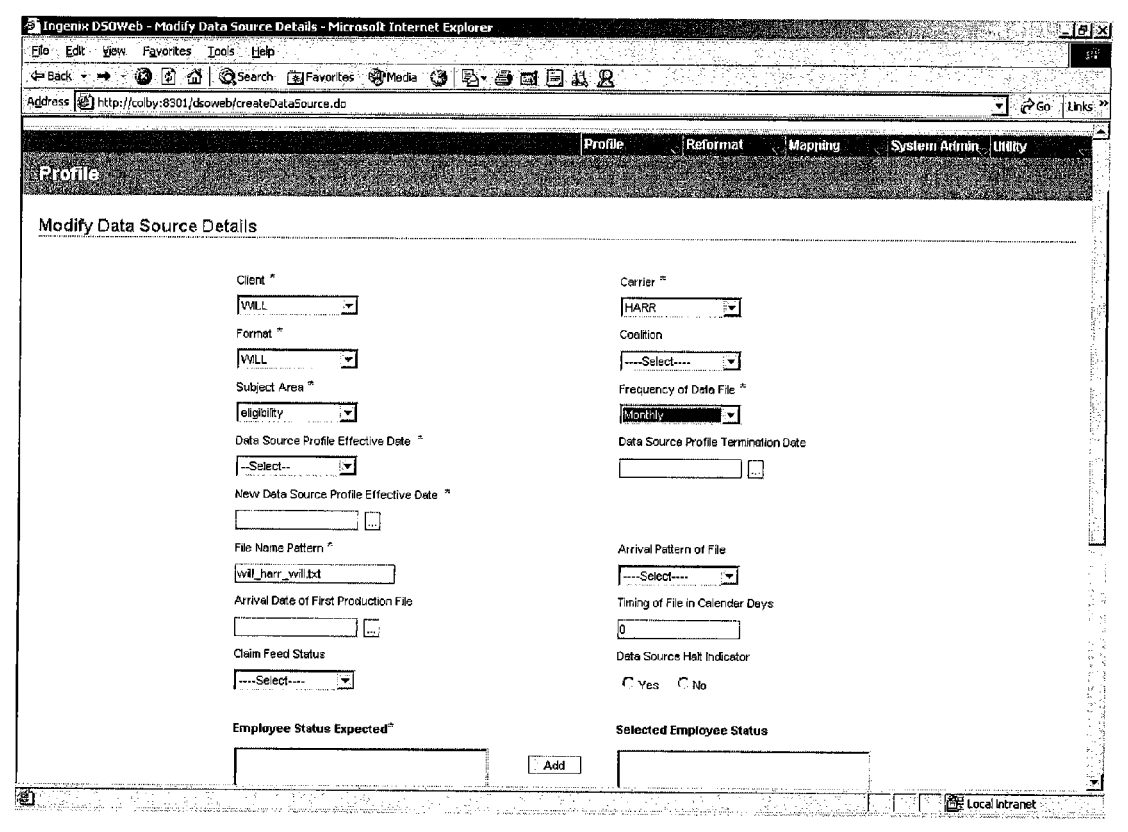

With reference to FIG. 8, the user next adds a data source, a step in which the user associates a client with a carrier and with a format. The user is prompted to enter the information in the following data fields:

---

Client
Carrier
Format
Data Source Profile Effective Date
Data Source Profile Termination Date
New Data Source Profile Effective Date
Frequency of Data file
File Name Pattern
Arrival Date of First Production file
Timing of File in Calendar days
Estimated Lives
Claims Feed status
Retroactivity Indicator
Retroactive Months
Data Source Halt Indicator
Is the vendor sending deceased employees?
Should Ingenix purges the deceased employees?
Where will Ingenix find the deceased employees?
Do you offer Domestic Partner Coverage?
Will the Domestic Partner be reported as an Employee with their own plan (Will the EESSNO be the Domestic Partner's SSNO)?
Do you offer surviving spouse coverage?
Will the surviving spouse be reported as an employee (will EESSNO contain the survivor's SSN)?
How can Ingenix identify the surviving spouse?
Where will Ingenix find the surviving spouse's SSNO?
Does this vendor provide split coverage?
Will the spouse be reported as an employee with their own plan (will EESSNO contain the spouse's SSN)?
How can Ingenix identify the spouse?
Where will Ingenix find the spouse's SSNO?
Will the data file contain terminated employees?
Should Ingenix purge the terminated employees?
What field(s) should Ingenix use to identify terminated employees?
Select Coverage Types from Expected Coverage Types
Select Employee Status from Expected Employee Status
Select Employee Type from Expected Employee Type
User Comments

---

Figure 9:
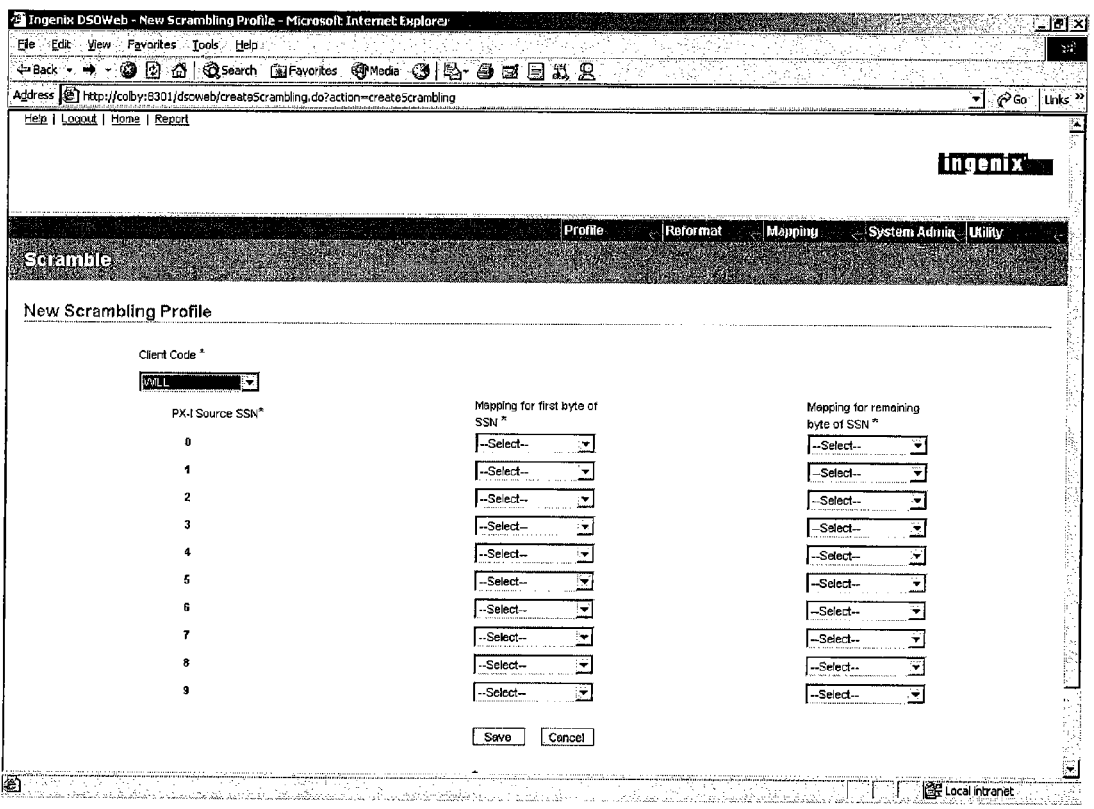

With reference to FIG. 9, the user next adds scrambling logic for social security numbers and other information with associated privacy or security issues. To access the interface of FIG. 9, the user selects Profile>Scrambling>Add Scrambling from the menu options on the Dashboard shown in FIG. 3. Using the interface of FIG. 9, the user selects a client code, for example, by using a drop-down box, and enters mapping for the various bytes of the SSN included in the raw data from the client.

Figure 10A:
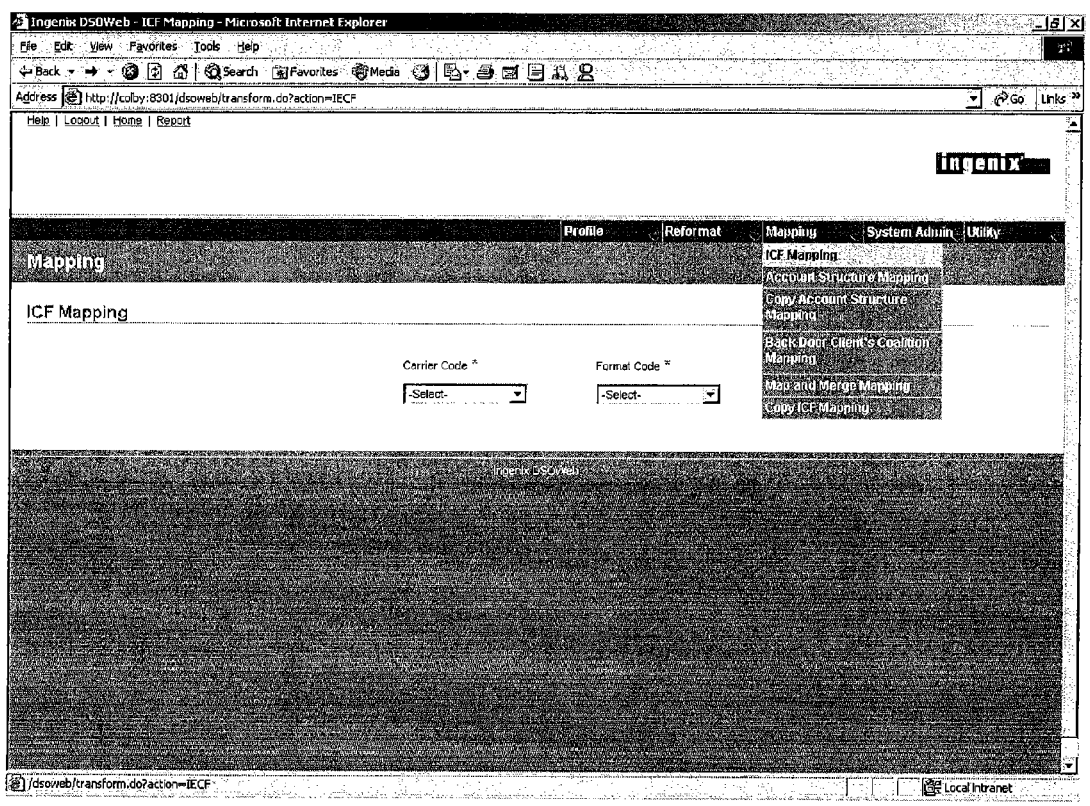
Figure 10B:
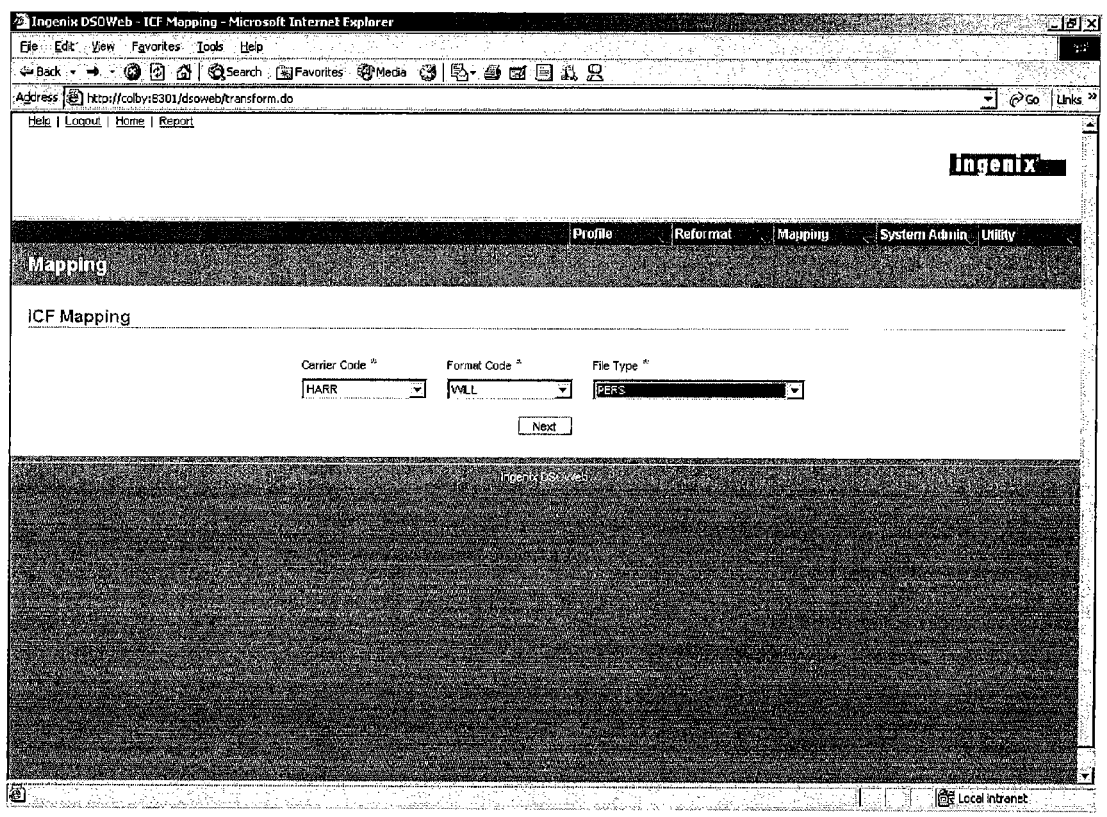

With reference to FIGS. 10A-10C, the user specifies the data transformation rules using the ICF mapping feature, which may be accessed from the Dashboard in FIG. 3 by selecting the Mapping>ICF Mapping menu options. In FIG. 10A, the user selects a carrier code and format code using the respective dropdown menus. In FIG. 10B, the user selects the file type for which the user wants to define mapping rules and then clicks "Next." In FIG. 10C, the user enters data transformation and mapping rules for ICF fields as follows:

Logical Name: The Logical Name may be auto populated with names of the ICF fields that belong to the File Type selected in FIG. 10B.

ICF Variable Name: Each of the Logical Names may have a corresponding Variable name that is used in the Mapping program logic. These variable names are auto populated.

Source Fields for Transformation: The user specifies the Source Field that will be used in the Mapping Logic. If the user wants to do a "Straight Move" of a Raw field into the ICF field, the user can use the Source Field drop down. However, if the desired mapping is complex and has conditional logic, the user may need to use the Transform function described in the next step.

Transform Function: Using the Transform function the user can write logical transform statements for the ICF fields.

Business Logic—is populated if a user performs the mapping using the transform function.

User comments—optional.

The user saves the entered transformation and mapping information upon completion and can follow the same steps described above with reference to FIGS. 10A-C to complete ICF Mappings for other file types.

Figure 11A:
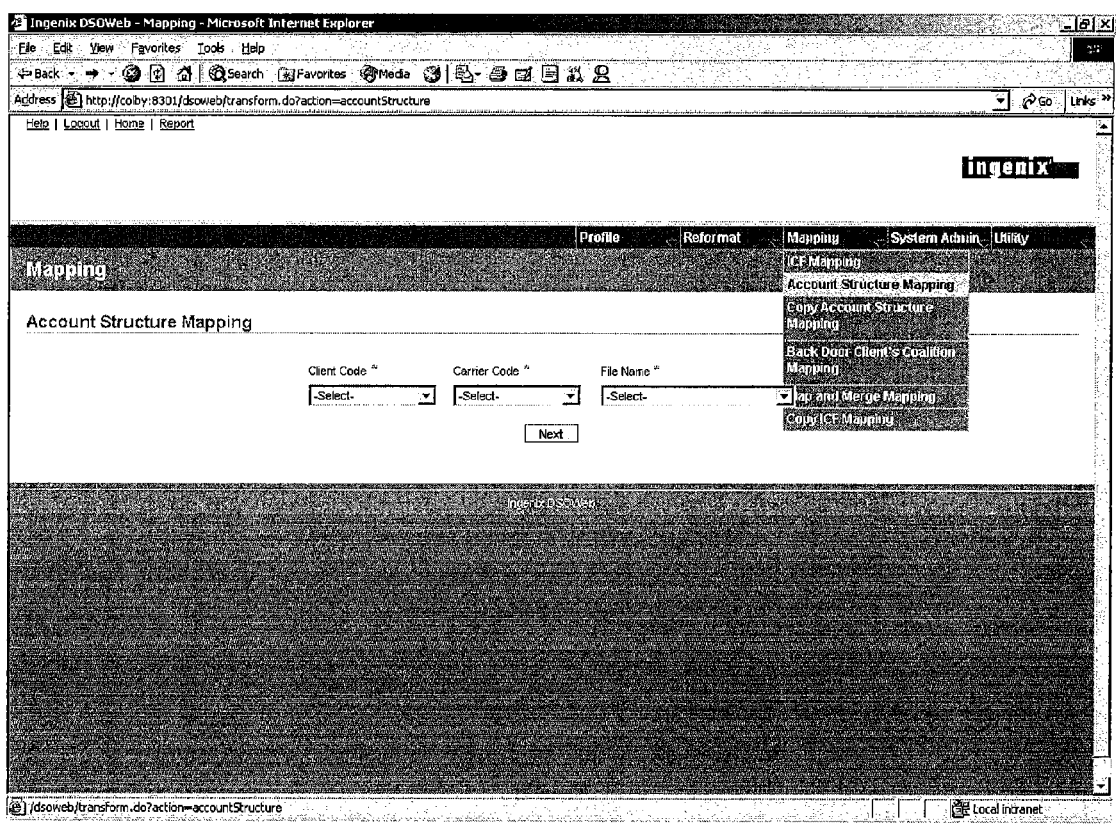
Figure 11B:
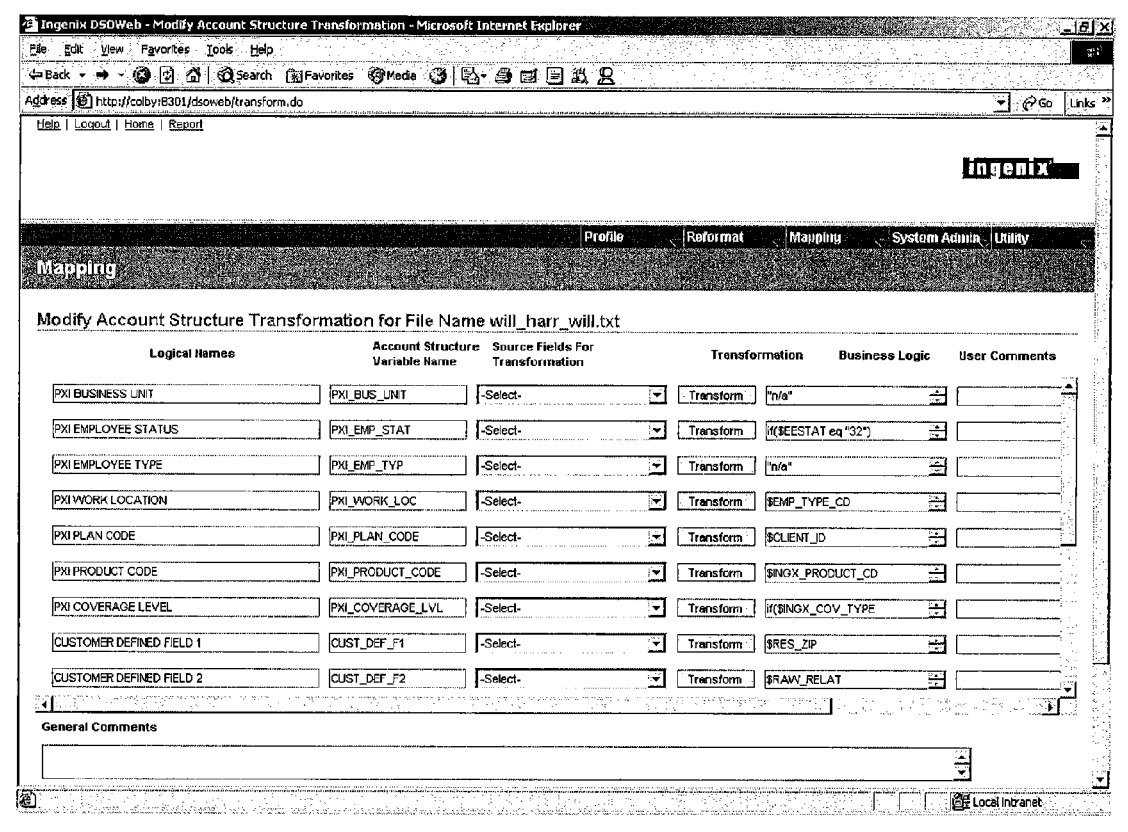

With reference to FIGS. 11A-B, the user enters account structure mapping in a process very similar to that described with reference to FIGS. 10A-C. The interface illustrated in FIG. 11A is accessed from the Dashboard in FIG. 3 by selecting the Mapping>Account Structure Mapping menu options. In FIG. 11A, the user selects the client code, the carrier code, and the file name from the respective dropdown lists and then clicks "Next." In FIG. 11B, the user enters:

Logical Name: The Logical Name may be populated with names of the ICF fields that belong to the File Type selected in FIG. 11.

Account Structure Variable Name: Each of the above Logical Names has a corresponding Variable name that will be used in the Mapping program logic.

Source Fields for Transformation: The user specifies the Source Field that will be used in the Mapping Logic. If the user wants to do a "Straight Move" of a field into the Account Structure field, the user can use the Source Field drop down. However, if the desired mapping is complex and has conditional logic, the user will use the Transform function described in the next step.

Transform Function: Using the Transform function the user can write logical transform statements for the Account Structure fields. No programming expertise is needed to complete this process.

Business Logic—is populated if a user performs the mapping using the transform function.

User comments—optional.

The user saves the entered transformation and mapping information upon completion.

The set-up process required to implement the process described with reference to FIG. 2 is now complete. The user may perform a job run with test data to insure that the metadata and information entered by the user can implement the transformation of raw data into uniform, quality-checked data ready for analysis.

Exemplary user interfaces associated with the process described in FIG. 2 will now be described in detail with reference to FIGS. 12-16.

Quality Checking and Trending

Figure 12:
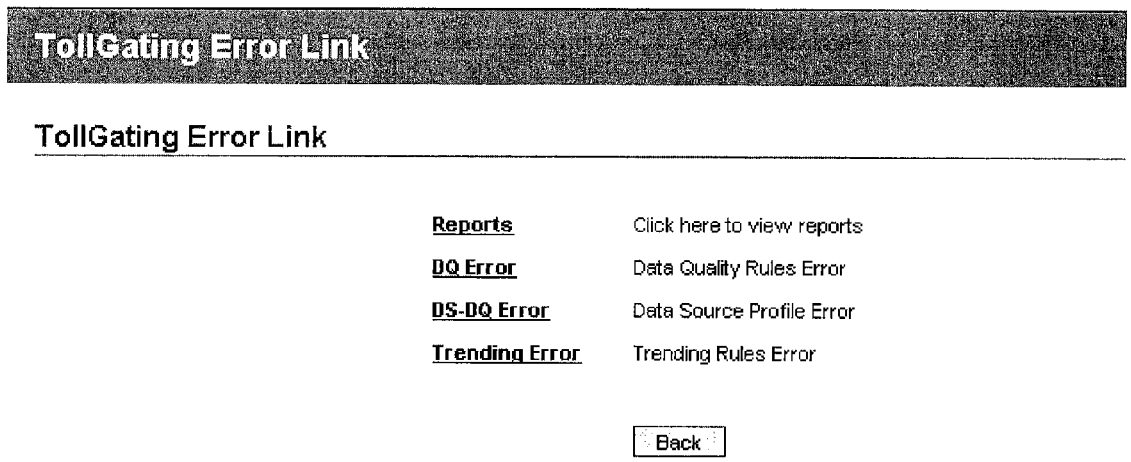

After the raw data have been converted into a standard format known as Ingenix Eligibility Common Format (IECF), three kinds of data quality checks are performed. FIG. 12 depicts the screen appears if the user clicks on "Quality Error". One or all of "DQ error", "DS-DQ error" and "Trending error" link may appear depending on whether the data have data quality rule errors or data source profile errors or trending rule errors.

Data Quality Rules Error (DQ Error)

Figure 13:
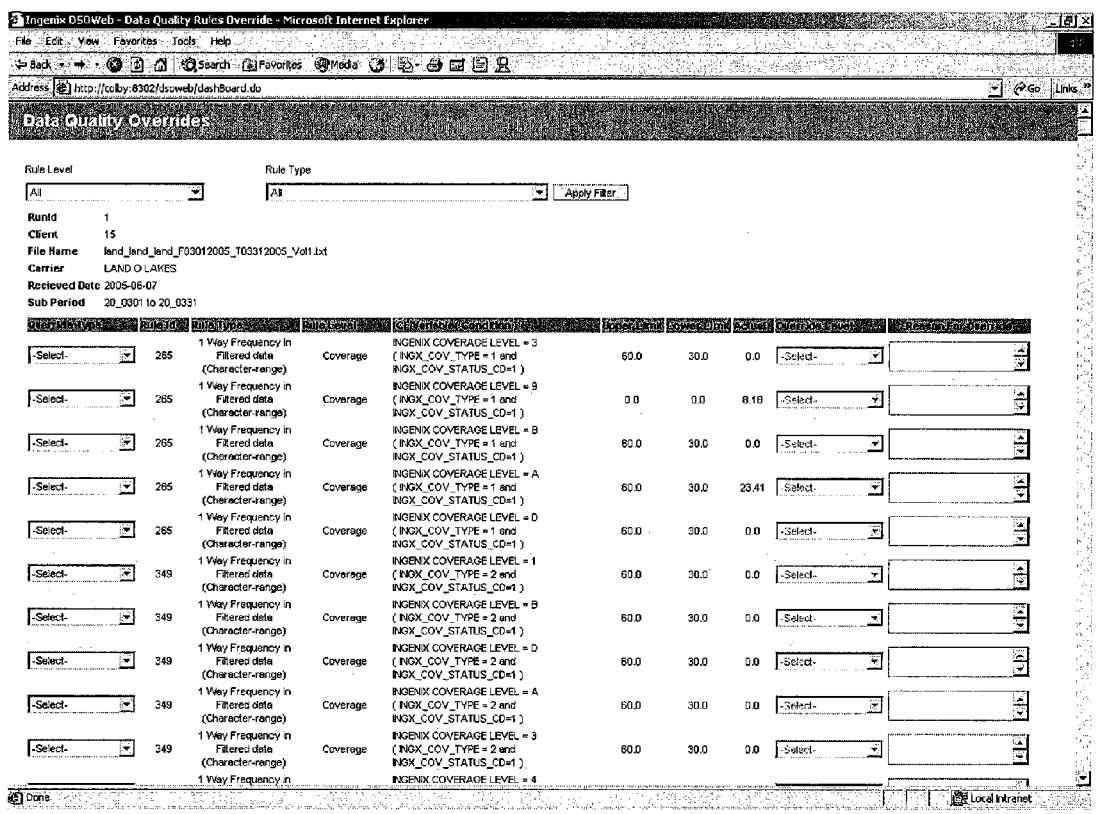

DSOWeb uses data quality structure rules that determine if the percentage of records where a particular field has a specific value/condition lies within a pre-determined tolerance range. Sometimes, the rules have additional filtering criteria where values in fields other than the main field are also considered. FIG. 13 depicts an exemplary screen that may be displayed when the "DQ-Error" link is selected by the user and the user sets the filter for "rule level" and "rule type" to "all." The rule level can be filtered based on whether the data quality error was due to coverage table/person table/subscriber table fields. A rule level of 'multi' indicates that the error is due to a combination of fields from more than one of the eligibility tables.

Data structure rule type can be filtered according to the following:

| Rule Type | Comments |
| --- | --- |
| 1 Way Frequency | Checks if a field has a particular value. For example, Ingenix Employee Type = 2 |
| Null Values | Checks if a field has default values. DSOWeb assigns default values to blank fields. |
| Default date value | Checks the date fields for default date value (Jan. 1, 1700) |
| 1 Way Frequency in Filtered data (Character-range) | This rule type can be viewed as one row of a 3-way freq. For example, INGENIX COVERAGE LEVEL = 1 (INGX__COV__TYPE = 1 and INGX__COV__STATUS__CD = 1). The condition in brackets contains the additional filter. |
| Multi Filter Null Values | Checks if a field has default values when some other fields take specific values/conditions. For example, COVERAGE TIER = Default ( INGX__COV__TYPE = 1 and INGX__COV__STATUS__CD = 1 ) |
| Date Difference in filtered data | Checks if a date field is greater than another date field when some other fields take specific values/conditions. For example, SUBSCRIBER HIRE DATE & SUBSCRIBER CREDIT SERVICE DATE = LOW-0 ( SUB__HIRE__DT ~= . and SUB__CREDIT__SVC__DT ~= . ) |
| Default date value in filtered data | Checks if a date field is default when some other fields take specific values/conditions. For example, ELIGIBILITY BEGIN DATE = Default ( INGX__COV__TYPE = 1 and INGX__COV__STATUS__CD = 1 ) |
| Multi Filter 1 Way Frequency | This is similar to 1 way frequency in filtered data except that the condition within brackets contains fields from more than one of the eligibility tables - coverage, person, subscriber. |
| Repeating Values in filtered data | Checks if a field has repeating values when some other fields take specific values/conditions. |
| Valid Values in filtered data | Checks if a field has invalid values when some other fields take specific values/conditions. For example, INGENIX PRODUCT CODE = Invalid ( INGX__COV__TYPE = 2 and INGX__COV__STATUS__CD = 2 ) |
| Repeating Values | Checks if a field has repeating values. |

With reference to FIG. 13, the following information is displayed and/or entered by the user:

| Column name | Comments |
| --- | --- |
| Override type | Once the user determines that a particular rule is not relevant for the data feed, the user can override the rule either for just the current update or permanently. |

-continued

| Column name | Comments |
| --- | --- |
| Rule Id | Each of the rules in DSOWeb is assigned a rule ID |
| Rule type | See Rule Type table above |
| Rule level | E.g., "coverage" |
| ICF variable (condition) | This gives the field names and the values they take. Sometimes additional conditions are given within brackets for those rules that include filtered data. |
| Upper limit | Gives the maximum tolerance percentage for a given rule |
| Lower limit | Gives the minimum tolerance percentage for a given rule |
| Actual | Gives the actual percentage of records falling within a given rule |
| Override level | If the override type is selected as "permanent", then this colunm lets the user choose whether the override is at the level of client, carrier-format or coalition Different users have different role-based access levels to overrides. For example, only some of the designated users can override rules that affect multiple clients. |
| Reason for override | The user may enter their comments here on why the rule was overridden. |

Once the user has selected all the rules the user wishes to override, the user clicks the "override" button at the bottom of the screen to affect the overrides.

Data Source Profile Error (DS-DQ Error)

A profile is created for each client data feed when the client is implemented in DSOWeb as described above. A user can view the data source profile for the user's client feeds as depicted in FIG. 14 by going to "Profile->Data Source->View Data Source" at the top of the DSOWeb Dashboard (FIG. 3).

Figure 14:
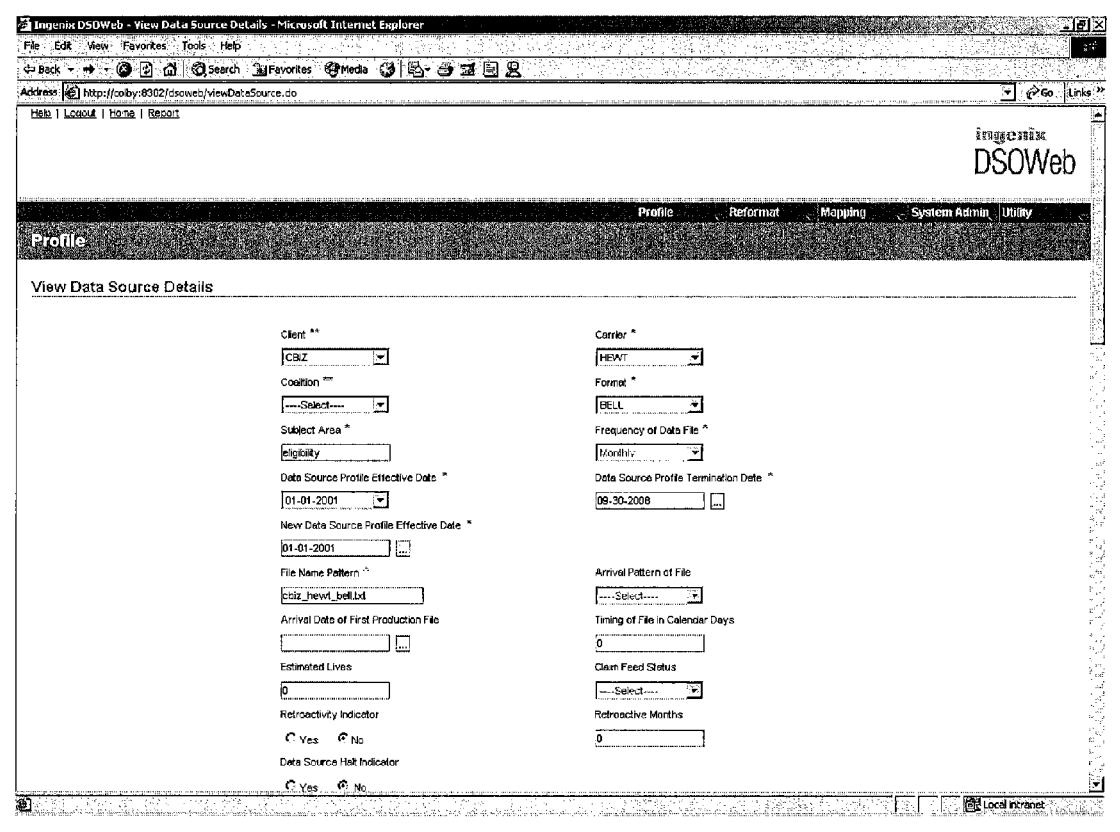

With reference to FIG. 14, the data source profile includes feed specific information (such as payer id, employee status, and employee type, etc.) that are expected to appear in the data feed. A data source profile error is flagged if the concerned data feed consists of field values other than those entered in the data source profile form (FIG. 8). For example, an error may be flagged if a data feed profile is set up to receive only data for active employees, but the received data also includes data for retirees.

Clicking on the DS-DQ error link displays a report highlighting the profile fields containing values other than those which the client feed is set up to receive. Once the user has determined that the new values are acceptable, the user can go to "Profile->Data Source->Modify Data Source" and add the new value(s) to the expected set of values (see FIG. 8).

Trending Errors

In the current example, data trending requirements may be implemented at two levels:

1) Month-to-date (MTD) trending with the previous month's data.
2) A year-to-date (YTD) trending with the previous year-to date data.

For YTD, the trending is done up to the month the data is being processed. For example, if the plan begin month is January and the current processing month is June, then trending is performed between received year's January-June data and its previous year's January-June data.

The following represent exemplary tolerance ranges:

| Record Count | Passing Range |
| --- | --- |
| Less Than 10000 | −5% to +5% |
| 10001-25000 | −3% to +3% |
| Greater Than 25000 | −1% to +1% |

All months are aggregated in the period: for example, (January+February+March+April+May+June of 2005/January+February+March+April+May+June of 2004)*100. Added/dropped values of less than 1% are ignored.

The screen depicted in FIG. 15 displays the data quality trending error.

| Column Name | Comments |
| --- | --- |
| Trend ID | ID of the trending rule being applied. |
| Trend level | This is same as rule level. |
| ICF variable (condition) | This gives the field names and the values they take. Sometimes additional conditions are given within brackets for those rules that include filtered data. |
| Previous Trend Limit (%) | |
| Current Trend Limit (%) | |
| Submission Difference | |
| Change Difference | |

Once the user has determined that the fluctuations are acceptable, the user can override the rule. In one embodiment, trending override can only be for the current run and not permanent; other implementations may allow for permanent override capability.

After clicking the "override" button, the user is automatically returned to the Dashboard (FIG. 3). The status of the job run is now "completed" against the tollgate step. There is also a "continue" button at the end of the row for the job run. Clicking on it resumes the job run and the process proceeds to the data quality, trending and tollgating steps.

Quality Errors

After the Data Quality and Data Source errors have been corrected, the current submission data are compared against the previous submission at the application specific toll gating level. Two kinds of error might be generated at this time.

If and when there is a difference (above the tolerance level) between the two submissions for any application specific variable then an application specific error will be generated. The screen depicted in FIG. 16 displays the application specific error for each variable containing the following values:

| Columns: |
| --- |
| Previous Trend Limit (%) |
| Current Trend Limit (%) |
| Submission Difference |
| Change Difference |

Once the cause of the error has been determined, the user can override it and restart the job. The Override Type applies to the current run only for this type of error.

Referential Integrity Error

A Referential Integrity (RI) error is generated when there is a mismatch between the Account Structure data and the submitted data. For example, if the BUSUNIT column in account structure contains the values for New York, Pennsylvania and Georgia and the received data file contains an additional value of Connecticut, an RI error report will be generated. The RI Error may generate an error report listing the column details.

Once the user determines the cause of the error, they may want to correct the Account Structure by updating the reformat mappings to capture the new data value.

Data Signoff

Once all Data Quality and/or application specific quality error rules are overridden, the user is returned to the Dashboard (FIG. 3). The status of the data feed is now "completed" and there is a "Continue" button next to the feed. Clicking on the continue button signals the process to proceed beyond the data review stage: file load, history processing, merge, and cleanup. Once these steps are completed, the data is ready to be loaded into the application specific tool (or into any desired data store or tool).

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

We claim:

1. A computer-implemented system for processing data, comprising:
    a user interface for enabling a user to enter mapping data to enable incoming health insurance data to be converted to a common data format;
    a database for storing the mapping data and data quality rules, wherein the data quality rules include data quality structure rules and data trending requirements;
    a receiver for receiving data from a data source; and
    a computer processor for automatically formatting the received data into the common data format using the mapping data input by the user to create common format data, wherein the computer processor applies the data quality rules to the common format data to identify potential errors in the common format data and notifies the user of any common format data containing one or more potential errors to enable the user to resolve the one or more potential errors in the common format data to complete quality checking of the common format data,
    wherein the user may redefine the mapping data or data quality rules to enable acceptance of values in the common format data identified as containing the one or more potential errors.

2. The system according to claim 1, wherein the data source is an employer or other supplier providing raw data concerning its employees.

3. The system according to claim 1, wherein the user may accept or reject the common format data containing potential errors, wherein rejected common format data is removed from the common format data.

4. A computer-implemented method for processing data, comprising:
    receiving mapping data entered by a user via a user interface to enable incoming health insurance data to be converted to a common data format;
    storing the mapping data and data quality rules in a database, wherein the data quality rules include data quality structure rules and data trending requirements;
    receiving data from a data source at a computer processor;
    formatting the received data into the common data format using the mapping data input by the user to create common format data, wherein the formatting is performed by the computer processor;
    using the computer processor to apply the data quality rules to the common format data to identify potential errors in the common format data;
    using the computer processor to notify the user of any common format data containing one or more potential errors; and
    receiving at the computer processor instructions input by the user to resolve the one or more potential errors in the common format data to complete quality checking of the common format data,
    wherein the user may redefine the mapping data or data quality rules to enable resolution of the one or more potential errors in the common format data.

5. The method according to claim 4, wherein the data source is an employer providing raw data concerning its employees.

6. The method according to claim 4, wherein the user instructions may accept or reject the common format data containing potential errors, wherein rejected common format data is removed from the common format data.

* * * * *